United States Patent [19]

King et al.

[11] Patent Number: 5,106,680
[45] Date of Patent: Apr. 21, 1992

[54] ADHESION BETWEEN CARBON FIBERS AND THERMOPLASTIC MATRIX MATERIALS IN CARBON FIBER COMPOSITES BY USING MULTIFUNCTIONAL AMINE AND AZO COMPOUNDS AS BRIDGING AGENTS

[75] Inventors: Julia A. King, Ponca City, Okla.; Daniel A. Buttry, Laramie, Wyo.

[73] Assignee: Hoechst Celanese Corporation, Somerville, N.J.

[21] Appl. No.: 520,694

[22] Filed: May 8, 1990

[51] Int. Cl.$^5$ .................. B05D 3/02; B05D 1/18; D02G 3/00; B32B 9/00

[52] U.S. Cl. .................. 428/288; 427/384; 427/434.6; 428/297; 428/375; 428/373; 428/408; 428/902; 428/378; 156/178; 156/181

[58] Field of Search .................. 428/408, 378

[56] References Cited

U.S. PATENT DOCUMENTS 4,489,129 12/1984 Shue et al. .................. 428/378
4,842,933 6/1989 Cizmecioglu .................. 428/378

OTHER PUBLICATIONS

DeVilbiss, T. A. et al., "Surface Characterization in Composite and Titanium Bonding: Carbon Fiber Surface Treatments for Improved Adhesion to Thermoplastic Polymers," Final Report to NASA-Langley Research Center, Grant No. NAG-1-343, Sep., 1987.
Bascom, W. D., "Interfacial Adhesion of Carbon Fibers," NASA Contractor Report 178306, Contract NAS 1-17918, Aug. 1987.
Bascom, W. D. et al., "The Adhesion of Carbon Fibers To Thermoset and Thermoplastic Polymers," Conference: Chemistry and Properties of High Performance Composites: Designed Especially for Chemists. West Point, N.Y., Oct., 1988.
Bascom, W. D., "Suface and Interfacial Properties of Carbon Fibers," NASA-CR-182890, Process Report NAG-1-706, Oct. 1, 1987-Apr. 15, 1988.
Hamdan, S. et al., "The Surface Treatment and Adhesion Bonding of Polyetheretherketone, Part I. Adhesive Joint Strength," *Journal of Adhesion Sciecne and Technology*, vol. 1, (1987), pp. 281-289.
Peacock, J. A. et al., "Examination of the Morphology of Aromatic Polymer Composite (APC-2) Using an Etching Technique," *Composite Interfaces*, H. Ishida and J. L. Koenig, Eds., Elsevier Publishing Co., Inc., (1986), pp. 299-305.
Monte, S., *Ken-React Reference Manual*, Kenrich Petrochemical, Bayone, N.J. (1987).

Primary Examiner—George F. Lesmes
Assistant Examiner—James D. Withers
Attorney, Agent, or Firm—Robert H. Hammer, III

[57] ABSTRACT

Adhesion between carbon fibers and thermoplastic matrix materials, used in carbon fiber composite materials, is promoted by the use of a bridging agent. The composite material includes: a plurality of carbon fibers; a thermoplastic matrix material intermingled among the plurality of carbon fibers; and a bridging agent adhering the plurality of carbon fibers to the thermoplastic matrix material. The bridging agent includes compounds having multifunctional groups that are capable of chemically bonding with a functional group fo the carbon fiber and a functional group of the thermoplastic matrix material; but it excludes multifunctional amine compounds having metal-oxygen bonds.

8 Claims, 2 Drawing Sheets

ADHESION BETWEEN CARBON FIBERS AND THERMOPLASTIC MATRIX MATERIALS IN CARBON FIBER COMPOSITES BY USING MULTIFUNCTIONAL AMINE AND AZO COMPOUNDS AS BRIDGING AGENTS

FIELD OF THE INVENTION

The instant invention is directed towards promoting adhesion between the carbon fibers and the thermoplastic matrix materials used in carbon fiber composite materials.

BACKGROUND OF THE INVENTION

Composite materials used in high performance applications are typically being prepared from polyacrylonitrile (PAN)-based carbon fibers and a thermoset matrix material, such as an epoxy. Although such materials exhibit excellent strength and stiffness properties, they are generally limited to moderate operational temperatures (e.g., less than 177° C.) and are relatively brittle (i.e., low impact strength). These limitations are mostly due to the thermoset matrix or resin system. Consequently, much interest has been generated in the development of better matrix materials. Much of this interest has been directed toward thermoplastic matrix or resin systems.

Many thermoplastic resins have significantly higher use temperatures and are tougher (i.e., higher impact strength) than the thermosets (i.e., epoxies) currently used. In addition, most thermoplastic resins are solvent resistant, and have thermal and environmental stability suitable for high performance applications, such as aircraft structures. Also, since thermoplastics consist of molecules that are physically bonded together as opposed to thermosets which consist of chemically bonded molecules, thermoplastics can be reformed. This facilitates repairs to composite structures. Consequently, the use of thermoplastic matrix materials in high performance applications, such as advanced aerospace systems, is anticipated.

One common problem with thermoplastic matrices is that the adhesion of these materials to carbon fibers is typically weaker than that of thermosetting materials. Good fiber-matrix adhesion is necessary in order to produce composites with desirable mechanical properties. If the fiber-matrix adhesion is poor, the composite will fail at the fiber-matrix interface, thus reducing the shear strength and other mechanical properties of the composite. Standard surface treatments of carbon fibers, which are designed for thermoset resins, generally result in little improvement in carbon fiber-thermoplastic matrix adhesion. Since no chemical reaction occurs during the fabrication of thermoplastic matrix composites, the likelihood of forming covalent chemical bonds between the fiber and the thermoplastic matrix material is greatly diminished. The formation of chemical bonds at the interface has been shown to be a significant factor in improving the interfacial bond strength in many composite systems.

Very little information has been published regarding the adhesion of carbon fibers to thermoplastic matrix materials. Thermoplastic matrices are, in general, new to the composites industry. In fact, only two major groups of researchers have published results of studies concerning the adhesion of carbon fibers to thermoplastic matrices. T. A. DeVilbiss and J. P. Wrightman, "Surface Characterization In Composite And Titanium Bonding: Carbon Fiber Surface Treatments For Improved Adhesion To Thermoplastic Polymers," Final Report to NASA-Langley Research Center, Grant No. NAG-1-343, September 1987, and W. D. Bascom, "Interfacial Adhesion Of Carbon Fibers," NASA Contractor Report 178306, Contract NAS1-17918, August 1987.

DeVilbiss and Wrightman studied the adhesion of PAN-based carbon fibers to polysulfone, polycarbonate, and polyetherimide thermoplastic matrices. They used Hercules AU4 and AS4, Dexter Hysol XAU and XAS, and Union Carbide T-300U and T-300S carbon fibers in their studies. The letter "U" in these fiber designations indicates that the fibers were not commercially surface treated. The letter "S" designated that they were commercially surface treated. DeVilbiss and Wrightman determined the shear strength for both the commercially treated and untreated carbon fibers. In addition, they conducted one anodization treatment in 0.5M sulfuric acid and one in 0.5M sodium hydroxide on each type of untreated carbon fiber. Both treatments were conducted at 6 volts for 15 minutes.

For all these composite systems, they reported shear strengths in the range of 14 to 27 MPa (2.0 to 3.9 ksi), which is less than half that of most carbon/epoxy composites. In all three matrix materials, the adhesion was the best for either the sulfuric acid or sodium hydroxide anodized AU4 carbon fiber. The failure location (i.e., the matrix, the interface, or the fiber) was not given.

Bascom et al studied the adhesion of three different PAN-based carbon fibers, Hercules AS4 and AS1, and Grafil XAS, to several different thermoplastic matrices using the embedded single fiber test. Also see: W. D. Bascom, K. J. Yon, R. M. Jensen, and L. Cordner, "The Adhesion Of Carbon Fibers To Thermoset And Thermoplastic Polymers," Conference: Chemistry and Properties of High Performance Composites: Designed Especially for Chemists, West Point, N.Y., October 1988; and W. D. Bascom, "Surface And Interfacial Properties Of Carbon Fibers," NASA-CR-182890, Progress Report NAG-1-706, Oct. 1, 1987–Apr. 15, 1988. Bascom et al determined that the XAS fibers demonstrated better adhesion to these thermoplastics than the AS fibers because of the lower surface basicity of the XAS fibers relative to the AS4 fibers. The AS fibers are more graphitic, and thus, they have a more basic fiber surface than XAS fibers. Water is strongly adsorbed onto these highly basic, graphitic regions present on the AS fibers. Apparently, this adsorbed water inhibits the adsorption of thermoplastic matrices. For a polar matrix system, such as epoxy, this situation is not a problem, since the water is easily displaced by the polar epoxy polymer.

A very limited amount of information has been published concerning the adhesion of carbon fibers to crystalline thermoplastics. Polyetheretherketone (PEEK) is a relatively new, partially amorphous/partially crystalline (semicrystalline) engineering thermoplastic, whose service temperature is above 200° C. PEEK is produced by ICI Corporation, and the majority of the information concerning the fiber-matrix adhesion of PEEK composites is proprietary. However, the open literature does contain a few reports concerning the adhesion of PEEK to various fibers. S. Hamdan and J. R. G. Evans, "The Surface Treatment And Adhesion Bonding Of Polyetheretherketone. Part I. Adhesive Joint Strength," Journal of Adhesion Science and Technology, Vol. 1, No. 4 (1987) pp. 281–289, and J. A. Peacock, B. Fife, E. Nield, and R. A. Crick, "Examination Of The Morphology Of Aromatic Polymer Composite (APC-2) Using An Etching Technique," *Composite Interfaces*, H. Ishida and J. L. Koenig, Eds., Elsevier Publishing Co., Inc. (1986) pp. 299-305.

Hamdan and Evans reported that the fiber-matrix adhesion of 20 percent fiber volume glass/PEEK composites was improved by chromate etching the PEEK for 30 minutes at 50° C. and by plasma etching the PEEK in oxygen for 15 minutes. Their conclusions were based on lap shear strength tests. Peacock et al used an etching technique to observe the matrix morphology in Hercules AS4/PEEK composites. They determined that their AS4/PEEK unidirectional composites displayed excellent short beam shear strength (viz., 105 MPa or 15.2 ksi) due to the fact that nucleation from the AS4 fibers dominated the morphology. Discrete spherulitic growth occurred at the AS4 surface before initiation started in the matrix. Thus, a high degree of intimacy between AS4 and PEEK was achieved. This nucleation that takes place on the AS4 surface is believed to be stress induced. Crystal growth was oriented perpendicular to the AS4 surface.

Generally, after a carbon fiber is commercially surface treated, a matrix compatible sizing (e.g., a thin layer of epoxy resin) is applied to the fiber surface. The sizing protects the fibers from being damaged when handled, and also helps preserve the surface functional groups. Bascom reported that a 0.1 weight percent application of a phenoxy sizing (PKHC, Union Carbide) on the AS4 surface slightly improved the adhesion of AS4/polycarbonate composites. The embedded single fiber test was used to quantify the fiber-matrix adhesion. No explanation was offered for the observed adhesion improvement.

Recently, titanium-based and zirconium-based coupling agents for carbon fiber/thermoplastic matrices have been developed. S. Monte and G. Sugarman, *Ken-React Reference Manual*, Kenrich Petrochemicals, Bayonne, N.J. (1987). For example, organotitanate coupling agents have been shown to improve the flexural modulus of carbon fiber/polyetheretherketone (PEEK) and carbon fiber/acrylonitrile-butadiene-styrene (ABS) composites. Ibid. PEEK and ABS are thermoplastic matrix materials. This adhesion improvement, as taught by Monte and Sugarman, is due to the direct reaction of the hydroxyl groups on the carbon fiber surface with the metal (Ti or Zr)-oxygen bond on the coupling agent. The chemical formulas for several specific titanium-based and zirconium-based coupling agents are as follows:

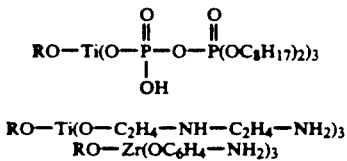

Accordingly, there is a continuing and ongoing need to explore the adhesion between carbon fibers and thermoplastic matrix materials.

SUMMARY OF THE INVENTION

The instant invention is directed to a carbon fiber composite material comprising: a plurality of carbon fibers; a thermoplastic matrix material intermingled among said plurality of carbon fibers; and a bridging agent adhering said plurality of carbon fibers to said thermoplastic matrix. The bridging agent includes compounds having multifunctional groups that are capable of chemically bonding with a functional group of the carbon fiber and a functional group of the thermoplastic matrix material, for example, multifunctional amine compounds and azo compounds, but it excludes those multifunctional amine compounds that include metal-oxygen bonds.

Alternatively, the instant invention is directed to a method for adhering carbon fibers to a thermoplastic matrix material in a carbon fiber composite material comprising the step of: adding a bridging agent to the thermoplastic matrix material and the carbon fibers prior to the consolidation of the carbon fiber composite material.

DESCRIPTION OF THE DRAWINGS

For the purpose of illustrating the invention, there is shown in the drawings a processing technique and form which is presently preferred; it being understood, however, that this invention is not limited to the precise arrangement and instrumentality shown.

DETAILED DESCRIPTION OF THE INVENTION

Adhesion between carbon fibers and the thermoplastic matrix materials used in carbon fiber composite materials, according to the instant invention, shall be discussed hereinafter.

The following terms shall have the following meaning:

"Carbon fiber"—a fiber of carbonous material which is suitable for use in composite material applications.

"Thermoplastic matrix material"—a high polymer that softens when exposed to heat and returns to its original condition when cooled. Exemplary thermoplastic matrix materials include, but are not limited to, liquid crystalline polymers (LCP), polyetheretherketone (PEEK), polyphenylene sulfide (PPS), polyethylene sulfone (PES), polycarbonate, polyetherimide, ABS. The thermoplastic matrix material may be in any form, for example, a fiber or a powder. Thermoplastic matrix material does not include "thermoset matrix material". Thermoset matrix materials are high polymers that solidify or "set" irreversibly when heated. An exemplary thermoset matrix material is epoxy.

"Bridging agent"—a material added to or coated on the carbon fibers and/or the thermoplastic matrix materials before consolidation of the carbon fiber composite material that promotes adhesion between the carbon fibers and the thermoplastic matrix material after consolidation. Exemplary bridging agents include, but are not limited to, those compounds having multifunctional groups that are capable of chemically bonding with a functional group of the carbon fiber and a functional group of the thermoplastic matrix material, for example, multifunctional amine compounds and azo compounds, but exclude those multifunctional amines that include metal-oxygen bonds. Further definition of specific bridging agents shall be found hereinafter.

It is theorized (however the invention is not limited to this theory) that adhesion between the carbon fibers and the thermoplastic matrix materials can be promoted by "bridging" together the carbon fiber and the matrix material. This "bridging" occurs when one of the functional groups on the bridging agent reacts with and bonds to a functional group on the carbon fiber and on the matrix material. In other words, the bridging agent forms a link, anchored by chemical bonds, between the carbon fiber and thermoplastic matrix material. Therefore, it is believed that adhesion occurs as a result of covalent bonding of the bridging agent between the carbon fibers and the thermoplastic matrix material.

Figure 1:
FIG. 1 is a photomicrograph of the sheared interface of a carbon fiber composite material that was not treated with the bridging agent.
Figure 2:
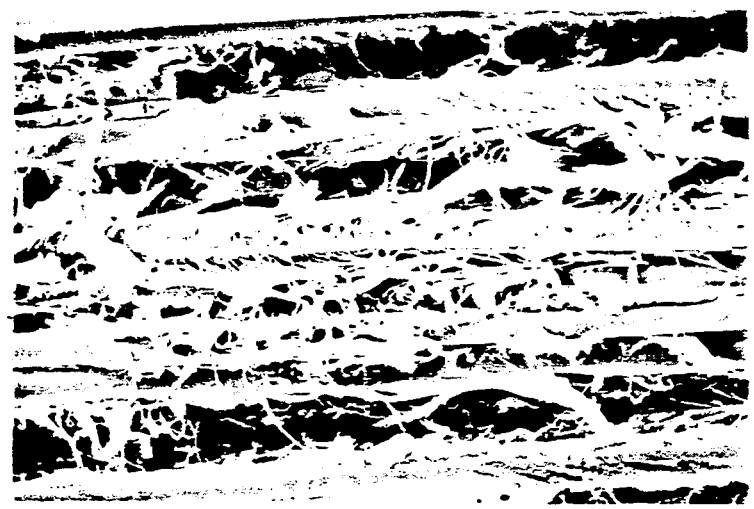
FIG. 2 is a photomicrograph of the sheared interface of a carbon fiber composite material that was treated with the bridging agent.

For example, compare FIGS. 1 and 2. FIG. 1 is a scanning electron microscope (SEM) photomicrograph (×780) of a sheared interface of an untreated (i.e., no bridging agent) carbon fiber/LCP composite. FIG. 2 is a SEM photomicrograph (×780) of a sheared interface of a treated (i.e., with bridging agent, 4-aminophenyl sulfone) carbon fiber/LCP composite. Note, in the former, the lack of fibrils interconnecting the fibers, whereas, in the latter, a larger number of fibrils interconnect the fibers. The fibrils comprise the LCP matrix material. Thus, the use of a bridging agent promotes the carbon fiber/LCP adhesion because, after shearing, more of the thermoplastic matrix material adheres to the fiber when the composite is treated than when the composite is not treated.

Multifunctional amine compounds belong in the class of compounds called bridging agents. Multifunctional amine compounds include those compounds having two or more amine groups. It is believed that one amine group reacts with a carboxylic acid group present on the carbon fiber surface to form amide bonds, Whereas, another amine reacts with an ester group of the LCP to form an amide bond, or it reacts with a sulfone group of the PES, or it reacts with the ketone group of PEEK. The following multifunctional amines are representative of this portion of the bridging agents: 1,4-diaminopiperazine hydrochloride; diethylenetriamine; 1,12-diaminododecane; 1,3-diaminopropane; 1,8-diaminonaphthalene; urea; 1,4-phenylenediamine; and 4-aminophenyl sulfone [$H_2N(C_6H_4)SO_2(C_6H_4)NH_2$].

Azo compounds having a second reactive group also belong in the class of compounds called bridging agents. The azo group upon thermal decomposition (such as would arise in the consolidation of composite materials) results in the formation of a carbon radical that can react with any C=C bonds on the carbon fiber surface under the condition (for example temperatures greater than 300° C.) found in the formation of carbon fiber composite materials. The second reactive group could include those groups discussed above with regard to the multifunctional amine compounds. The following azo compounds are representative of this portion of the coupling agents: aminoazobenzene; 4-4' azobis (4-cyanovaleric acid); and Fast Garnet GBC salt [$(C_6H_4)N=N(C_6H_3)N_2^+ p\text{-}CH_3\text{-}mHSO_4^-$]. Please note that in the foregoing compounds, the molecules contained at least one azo moiety and another reactive group, which would be reactive with a group on the thermoplastic matrix material.

Figure 3:
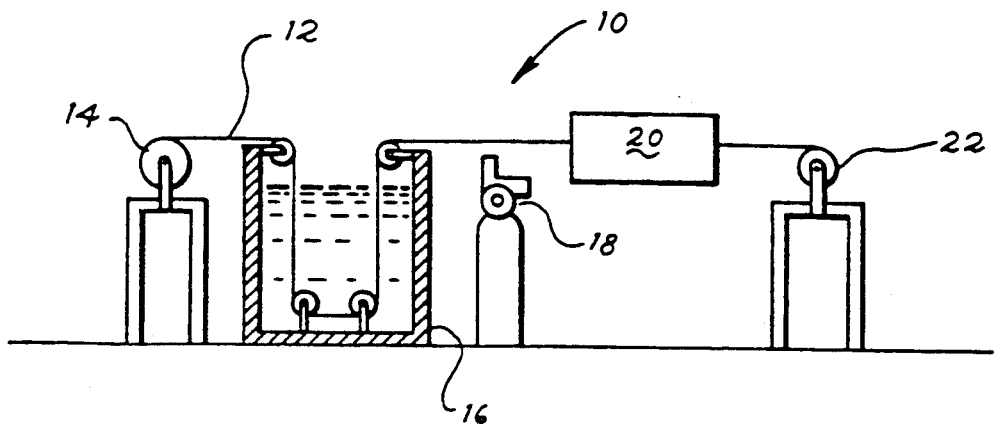
FIG. 3 is a schematic illustration of a "single bath" continuous process for treating commingled carbon fibers and fibers of the thermoplastic matrix material with the bridging agent.
Figure 4:
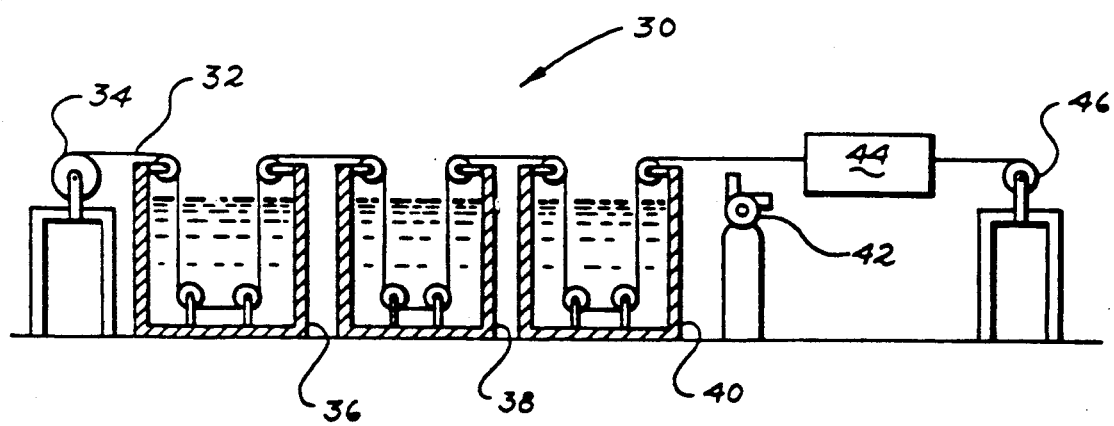
FIG. 4 is a schematic illustration of a "three bath" continuous process for treating commingled carbon fibers and fibers of the thermoplastic matrix material with the bridging agent.

Referring to FIGS. 3 and 4, two methods by which the bridging agent may be applied to the tow consisting of the intermingled carbon fibers and thermoplastic matrix material are illustrated. By either method, the tow is drawn through a bath of the solvated bridging agent and then subjected to heat so that any excess solvent is vaporized.

In FIG. 3, a "single bath" method 10 is illustrated. The tow 12 is unwound from a supply spool 14. Next, tow 12 is passed through a bridging agent bath 16. The bridging agent-wetted tow is then dried, by the use of an air blower 18 and tube furnace 20. Thereafter, the tow is taken up on a rewind spool 22.

In FIG. 4, a "three bath" method 30 is illustrated. The tow 32 is unwound from a supply spool 34. Then, the tow is passed through an acid bath 36. Acid bath 36 ensures that the carboxylic acid groups present on the surface of the carbon fiber are protonated. The acid bath 36 may comprise a 0.1M HCl solution. The protonated tow is then drawn through an alcohol bath 38. Alcohol bath 38 ensures the removal of residual acid from the tow and thereby prevents contamination of the bridging agent bath. The alcohol bath may comprise 2-propanol. The washed protonated tow is then drawn through a bridging agent bath 40. Thereafter, the tow is dried, via blower 42 and furnace 44, and taken up on rewind spool 46, as with the single bath method.

The short beam shear (SBS) test, ASTM Standard D2344-76, was used to determine the ultimate shear strength are $\tau_{13}{}^u$, using Equation 1.

$$\tau_{13}{}^u = 0.75 \, P_{max}/A \qquad \text{Eqn. (1)}$$

where:

Pmax = maximum value of applied force, and

A = cross-sectional area of the test specimen.

Note that the short beam shear test measures the interlaminar strength. The SBS ratio, discussed herein, is SBS strength of the treated composite divided by the SBS strength of the untreated composite.

The dimensions of the typical SBS test specimen were 15.2 mm (0.60") in length, 12.7 mm (0.50") in width, and 2.0 mm (0.08") in thickness. As recommended by the ASTM procedure for carbon fiber composites, a 5:1 span/depth (thickness) ratio was used. Accordingly, a span of 10.2 mm (0.40") was used. For these tests, an Instron Model 1125 electromechanical testing machine was used, along with a 5 kN load cell. The crosshead speed was held constant at 1 mm/min. A strip chart recorder was used to monitor the force applied to the test specimen.

The composite panels were fabricated under the following conditions: pressure—200 psi; temperature—300° C.; and time at temperature and pressure—20 minutes.

EXAMPLES

In Examples 1-23, a tow band containing carbon fibers intermingled with Hoechst Celanese's VECTRAN ® A900 grade fibers (a random copolymer consisting of about 73 mole percent p-hydroxy benzoic acid and 27 mole percent 6-hydroxy-2-naphthoic acid) was treated with various multifunctional amine compounds. The tow band comprised about 60±1 percent by volume carbon fiber. The carbon fiber was a PAN-based carbon fibers, for example, Hercules' surface treated 3k AS4 (3,000 fibers/tow); Grafil's surface treated 6k XAS (6,000 fibers/tow); or Grafil's 6k XAU (6,000 fibers/tow).

Referring to Table 1, the tow band was treated in either a "one bath" (FIG. 3) or "three bath" (FIG. 4) process. (If the "one bath" process was used, then no residence time is given for the first two baths.) Treatments were conducted at room temperature (approximately 23° C.). All reagents used were commercially available from Aldrich Chemical Company Inc. of Milwaukee, Wisc.

The hot air blower and furnace (a Lindberg tube furnace, 0.61 meters in length) was set so that all excess solvent is vaporized from the fiber. Weight percent refers to the weight of the reagent used per total weight of the tow band (total weight of the tow band was approximately 41.3 grams). The tow band length was about 143 meters (470 feet).

The composition of each bath is given. The residence time that the tow band resided in the bath is given. The average treated SBS strength is given. The SBS ratio is given.

The reagents listed in Table 1 are as follows: APS—4-aminophenyl sulfone; DAPP HCL—1,4-diaminopiperazine hydrochloride; DETA—diethylenetriamine; DADD—1,12-diaminododecane; DAP—1,3-diaminopropane; DAN—1,8-diaminonaphthalene; Urea; PDA—1,4 phenylenediamine.

The numbers following the reagents correspond to the weight percent of the reagent. The letters (A, R, W) following the reagents indicate either acid bath (A), repeat of treatment (R), or distilled water was used as the solvent (W).

In Examples 24-31, a tow band containing carbon fiber intermingled with LCP (as discussed in the foregoing Example Nos. 1-23) were treated with various azo compounds. In these examples, treatment was conducted in a "one bath" (FIG. 3) process. The residence time of tow band in the treatment bath was about 10 seconds. All other aspects are the same as set forth in Examples 1-23.

Referring to Table 2, the reagents listed are as follows: AAB-4 aminoazobenzene; ABCVA-azobis (4-cyanovaleric acid); GBC-Fast Garnet GBC salt.

TABLE 2

| Treatment No. | Name | Weight Percent | Weight of Reagent Used (g) | Volume of Solvent Used (ml) | Solvent | Average Treated SBS Strength (MPa) | (Ksi) | SBS Ratio |
|---|---|---|---|---|---|---|---|---|
| 24 | AAB-1 | 1.0 | 0.419 | 1300 | Methanol | 51 | 7.5 | 1.06 |
| 25 | AAB-10 | 10.0 | 4.160 | 1300 | Methanol | 50 | 7.2 | 1.05 |
| 26 | AAB-20 | 20.0 | 8.278 | 1300 | Methanol | 50 | 7.2 | 1.04 |
| 27 | ABCVA-1 | 1.0 | 0.413 | 1350 | Water | 49 | 7.1 | 1.00 |
| 28 | ABCVA-10 | 10.0 | 4.130 | 1300 | Methanol | 51 | 7.4 | 1.05 |
| 29 | ABCVA-40 | 40.0 | 16.520 | 1300 | Methanol | 37 | 5.4 | 0.76 |
| 30 | GBC-1 | 1.0 | 0.412 | 1300 | Water | 50 | 7.2 | 1.05 |
| 31 | GBC-10 | 10.0 | 4.133 | 1300 | Water | 50 | 7.3 | 1.06 |

In Comparative Examples 32-48, a tow band containing carbon fiber intermingled with LCP (as discussed in the foregoing Example Nos. 1-23) was treated with various compounds, outlined below, for comparison. In these examples, treatment was conducted in a "one bath" (FIG. 3) process or a "three bath" (FIG. 4) process. All other aspects are the same as set forth in Examples 1-23.

Referring to Table 3, the reagents listed are as follows:

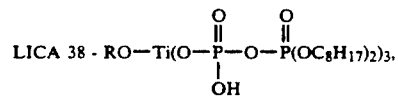

$$\text{LICA 38 - RO—Ti(O—}\overset{\overset{O}{\|}}{\underset{OH}{P}}\text{—O—P(OC}_8\text{H}_{17})_2)_3,$$

TABLE 1

| No. | Treatment Name | Weight Percent | Weight of Amine Used (g) | Volume of Solvent Used (ml) | Solvent | 0.1 M HCL Bath (seconds) | 2-Propanol Bath (seconds) | Amine Bath (seconds) | Average Treated SBS Strength (MPa) | (Ksi) | SBS Ratio |
|---|---|---|---|---|---|---|---|---|---|---|---|
| 1 | APS-1 | 1.0 | 0.417 | 1000 | Ethanol | — | — | 15.0 | 50 | 7.3 | 1.07 |
| 2 | APS-1A | 1.0 | 0.416 | 1000 | Ethanol | 12.5 | 17.5 | 15.0 | 58 | 8.4 | 1.22 |
| 3 | APS-1AR | 1.0 | 0.416 | 1000 | Ethanol | 12.5 | 17.5 | 15.0 | 53 | 7.7 | 1.13 |
| 4 | APS-10A | 10.0 | 4.183 | 3200 | Ethanol | 11.2 | 17.5 | 25.0 | 51 | 7.4 | 1.08 |
| 5 | DAPP-HCl-1 | 1.0 | 0.408 | 1300 | Water | — | — | 10.0 | 49 | 7.2 | 1.05 |
| 6 | DAPP HCl-10 | 1.0 | 4.187 | 1300 | Water | — | — | 10.0 | 53 | 7.7 | 1.12 |
| 7 | DETA-1 | 1.0 | 0.427 | 1300 | 2-Propanol | — | — | 10.0 | 51 | 7.4 | 1.08 |
| 8 | DETA-10 | 10.0 | 4.112 | 1300 | 2-Propanol | — | — | 10.0 | 52 | 7.6 | 1.11 |
| 9 | DETA-100A | 100.0 | 41.300 | 800 | 2-Propanol | 20.0 | 17.5 | 13.7 | 48 | 6.9 | 1.01 |
| 10 | DADD-1 | 1.0 | 0.413 | 1300 | Methanol | — | — | 10.0 | 54 | 7.8 | 1.06 |
| 11 | DADD-1A | 1.0 | 0.414 | 1300 | Methanol | 20.0 | 17.5 | 15.0 | 45 | 6.6 | 0.96 |
| 12 | DADD-1W | 1.0 | 0.417 | 1300 | Water | 20.0 | 16.2 | 15.0 | 48 | 6.9 | 1.01 |
| 13 | DADD-5 | 5.0 | 2.076 | 1300 | Methanol | — | — | 10.0 | 54 | 7.8 | 1.09 |
| 14 | DADD-10 | 10.0 | 4.129 | 1300 | Methanol | — | — | 10.0 | 55 | 7.9 | 1.08 |
| 15 | DAP-1 | 1.0 | 0.517 | 1300 | Methanol | — | — | 10.0 | 51 | 7.3 | 1.07 |
| 16 | DAP-10 | 10.0 | 5.040 | 1300 | Methanol | — | — | 10.0 | 51 | 7.4 | 1.08 |
| 17 | DAN-1 | 1.0 | 0.422 | 1300 | Acetone | — | — | 10.0 | 50 | 7.2 | 1.05 |
| 18 | DAN-10 | 10.0 | 4.205 | 1300 | Acetone | — | — | 10.0 | 50 | 7.2 | 1.05 |
| 19 | Urea-1 | 1.0 | 0.421 | 1300 | Methanol | — | — | 10.0 | 50 | 7.2 | 1.05 |
| 20 | Urea-10 | 10.0 | 4.131 | 1300 | Methanol | — | — | 10.0 | 50 | 7.3 | 1.06 |
| 21 | PDA-1 | 1.0 | 0.413 | 1300 | Methanol | — | — | 10.0 | 49 | 7.0 | 1.03 |
| 22 | PDA-10 | 10.0 | 4.135 | 1300 | Methanol | — | — | 10.0 | 45 | 6.5 | 0.95 |
| 23 | PDA-20 | 20.0 | 8.262 | 1300 | Methanol | — | — | 10.0 | 46 | 6.6 | 0.97 |

-continued

LICA 44 - RO—Ti(O—C₂H₄—NH—C₂H₄—NH₂)₃.
LZ97 - RO—Zr(OC₆H₄—NH₂)₃.

(LICA38, LICA44, and LZ97 are available from Kenrich Petrochemicals, Inc., Bayonne, N.J.), Nafion—a perfluorinated ion exchange powder, prepared from Nafion 117 perfluorinated membrane, in a mixture of lower aliphatic alcohols and water (Nafion is available from DuPont, Wilmington, Del.), PS—phenylsulfone, EA—ethylamine.

are selected from the group consisting of: 1,4-diaminopiperazine hydrochloride; diethylenetriamine; 1,12-diaminododecane; 1,3-diaminopropane; 1,8-diaminonaphthalene; urea; 1,4-phenylenediamine; and 4-aminophenyl sulfone.

4. The carbon fiber composite material according to claim 2, wherein said azo compounds are selected from the group consisting of: aminoazobenzene; 4-4' azobis (4-cyanovaleric acid); and Fast Garnet GBC salt.

5. A method for adhering carbon fibers to a thermoplastic matrix material in a carbon fiber composite mate-

TABLE 3

| No. | Treatment Name | Weight Percent | Weight of Reagent Used (g) | Volume of Solvent Used (ml) | Solvent | 0.1 M HCL Bath (seconds) | 2-Propanol Bath (seconds) | Coupling Agent Bath (seconds) | Average Treated SBS Strength (MPa) | (Ksi) | SBS Ratio |
|---|---|---|---|---|---|---|---|---|---|---|---|
| 32 | LICA 38-15 | 15.0 | 6.200 | 5500 | 2-Propanol | — | — | 11.4 | 50 | 7.3 | 0.97 |
| 33 | LICA 44-0.5A | 0.5 | 0.232 | 5500 | 2-Propanol | 13.8 | 15.0 | 15.0 | 56 | 8.1 | 1.09 |
| 34 | LICA 44-1A | 1.0 | 0.418 | 5500 | 2-Propanol | 15.0 | 17.5 | 17.5 | 56 | 8.1 | 1.08 |
| 35 | LICA 44-12 | 12.0 | 5.000 | 5500 | 2-Propanol | — | — | 11.4 | 51 | 7.3 | 0.98 |
| 36 | LZ 97-0.5A | 0.5 | 0.217 | 750 | DMF | 12.5 | 17.5 | 11.2 | 52 | 7.5 | 1.05 |
| 37 | LZ 97-1A | 1.0 | 0.418 | 700 | DMF | 11.2 | 17.5 | 13.7 | 52 | 7.5 | 1.05 |
| 38 | LZ 97-2A | 2.0 | 0.821 | 620 | DMF | 12.5 | 17.5 | 13.7 | 52 | 7.5 | 1.06 |
| 39 | LZ 97-5A | 5.0 | 2.065 | 540 | DMF | 11.2 | 17.5 | 13.7 | 54 | 7.9 | 1.14 |
| 40 | LZ-97-10A | 10.0 | 4.130 | 600 | DMF | 11.2 | 17.5 | 13.7 | 57 | 8.3 | 1.20 |
| 41 | LZ 97-10 | 10.0 | 4.172 | 600 | DMF | — | — | 9.6 | 56 | 8.1 | 1.18 |
| 42 | LZ 97-17 | 17.0 | 7.000 | 1200 | Kenplast PG | — | — | 9.6 | 56 | 8.1 | 1.08 |
| 43 | Nafion | 14.0 | 4.370 | 487 | Water | — | — | 10.0 | 43 | 6.2 | 0.91 |
| 44 | PS-1 | 1.0 | 0.419 | 1300 | Benzene | — | — | 10.0 | 47 | 6.8 | 1.00 |
| 45 | PS-10 | 10.0 | 4.130 | 1300 | Benzene | — | — | 10.0 | 50 | 7.2 | 1.05 |
| 46 | NH₃ | Gaseous ammonia at 41 PSIG, 62° C. for 3 hours | | | | — | — | — | N/A | 6.29 | 0.92 |
| 47 | EA-1 | 1.0 | | | Water | — | — | 10.0 | N/A | 7.11 | 1.02 |
| 48 | EA-10 | 10.0 | | | Water | — | — | 10.0 | N/A | 7.09 | 1.08 |

The present invention may be embodied in other specific forms without departing from the spirit or essential attributes thereof and, accordingly, reference should be made to the appended claims, rather than to the foregoing specification, as indicating the scope of the invention.

We claim:

1. A carbon fiber composite material comprising:
a plurality of carbon fibers;
a thermoplastic matrix material intermingled among said plurality of carbon fibers; and
a bridging agent adhering said plurality of carbon fibers to said thermoplastic matrix, said bridging agent comprises compounds having multifunctional groups capable of chemically bonding with a functional group of said carbon fiber and a functional group of said thermoplastic matrix material, said bridging agent excludes multifunctional amine compounds having metal-oxygen bonds.

2. A carbon fiber composite material comprising:
a plurality of carbon fibers;
a thermoplastic matrix material intermingled among said plurality of carbon fibers; and
a bridging agent adhering said plurality of carbon fibers to said thermoplastic matrix material, said bridging agent includes multifunctional amine compounds and azo compounds, said bridging agent excludes multifunctional amine compounds having metal-oxygen bonds.

3. The carbon fiber composite material according to claim 2, wherein said multifunctional amine compounds are selected from the group consisting of: 1,4-diaminopiperazine hydrochloride; diethylenetriamine; 1,12-diaminododecane; 1,3-diaminopropane; 1,8-diaminonaphthalene; urea; 1,4-phenylenediamine; and 4-aminophenyl sulfone.

4. The carbon fiber composite material according to claim 2, wherein said azo compounds are selected from the group consisting of: aminoazobenzene; 4-4' azobis (4-cyanovaleric acid); and Fast Garnet GBC salt.

5. A method for adhering carbon fibers to a thermoplastic matrix material in a carbon fiber composite material comprising the steps of: applying a bridging agent to the carbon fibers prior to consolidation of the carbon fibers with any thermoplastic matrix material, said bridging agent comprises compounds having multifunctional groups capable of chemically bonding with a functional group of said carbon fiber and a functional group of said thermoplastic material, said bridging agent excludes multifunctional amine compounds having metal-oxygen bonds.

6. A method for adhering carbon fibers to a thermoplastic matrix material in a carbon fiber composite material comprising the steps of: applying a bridging agent to the carbon fibers prior to the consolidation of the carbon fibers with any thermoplastic matrix material, said bridging agent includes multifunctional amine compounds and azo compounds, said bridging agent excludes multifunctional amine compounds having metal-oxygen bonds.

7. The method for adhering according to claim 6, wherein said multifunctional amine compounds are selected from the group consisting of: 1,4-diaminopiperazine hydrochloride; diethylenetriamine; 1,12-diaminododecane; 1,3-diaminopropane; 1,8-diaminonaphthalene; urea; 1,4-phenylenediamine; and 4-aminophenyl sulfone.

8. The method for adhering according to claim 6, wherein said azo compounds are selected from the group consisting of: aminoazobenzene; 4-4' azobis (4-cyanovaleric acid); and Fast Garnet GBC salt.

* * * * *